July 30, 1935.  G. L. MATEER  2,009,711

GRAVITY FLOW CONTROL

Filed Dec. 15, 1933  2 Sheets-Sheet 1

George L. Mateer Inventor
W. E. Currie Attorney

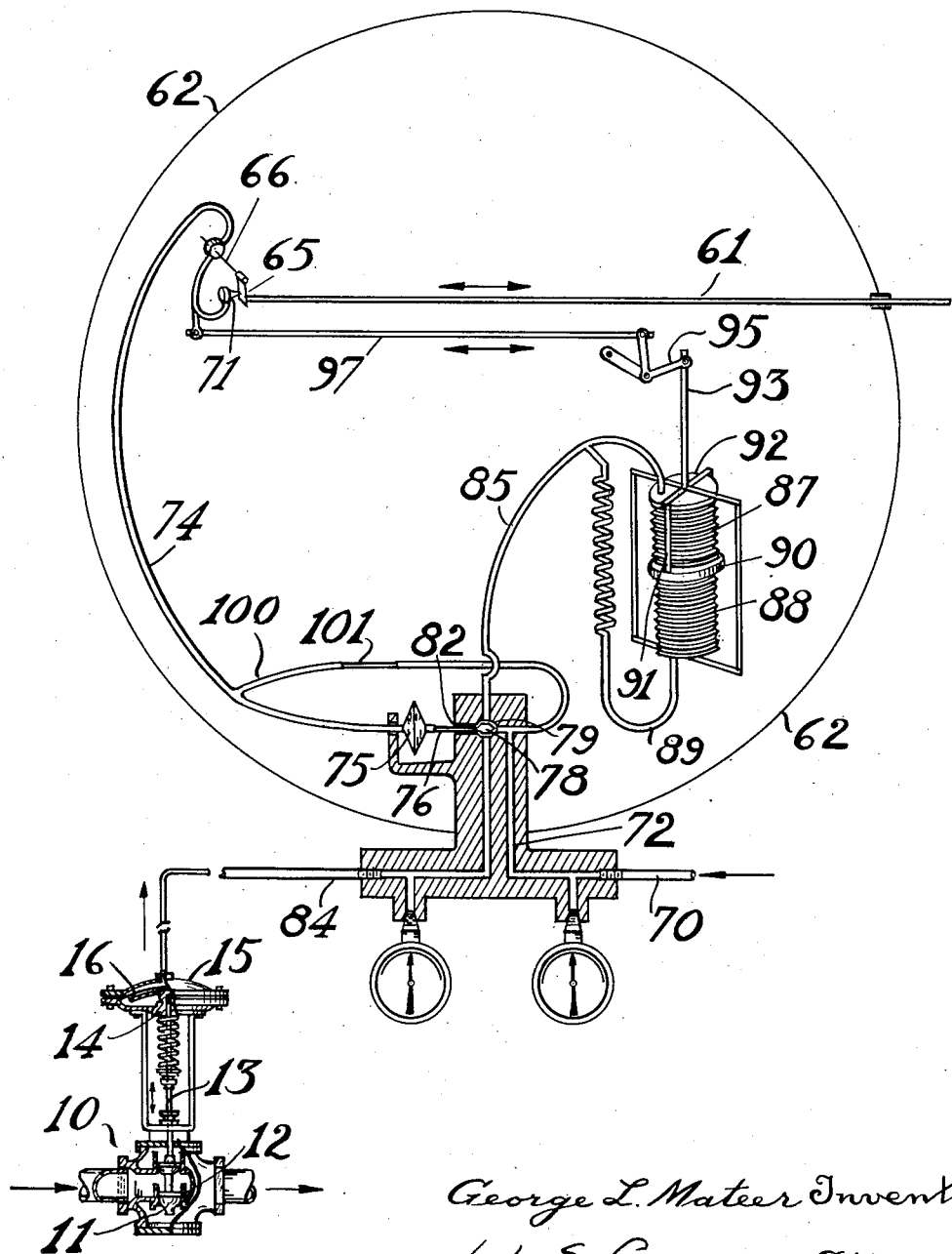

Patented July 30, 1935

2,009,711

UNITED STATES PATENT OFFICE 2,009,711

GRAVITY FLOW CONTROL

George L. Mateer, Roselle, N. J., assignor to Standard Oil Development Company, a corporation of Delaware Application December 15, 1933, Serial No. 702,567

6 Claims. (Cl. 196—132)

This invention relates to an improved flow controller. More particularly, it relates to a construction for utilizing variations in specific gravity of vapors flowing through a passageway to control flow of liquid flowing through a conduit.

It is an object of this invention to provide a construction for automatically varying the flow of liquid through a passageway in accordance with variations in the specific gravity of gas flowing through a conduit.

Other objects will be apparent from the specification and from the accompanying drawings in which latter—

Fig. 3 is a diagrammatic view of the stabilizer pressure control of the mechanism.

Figure 1:
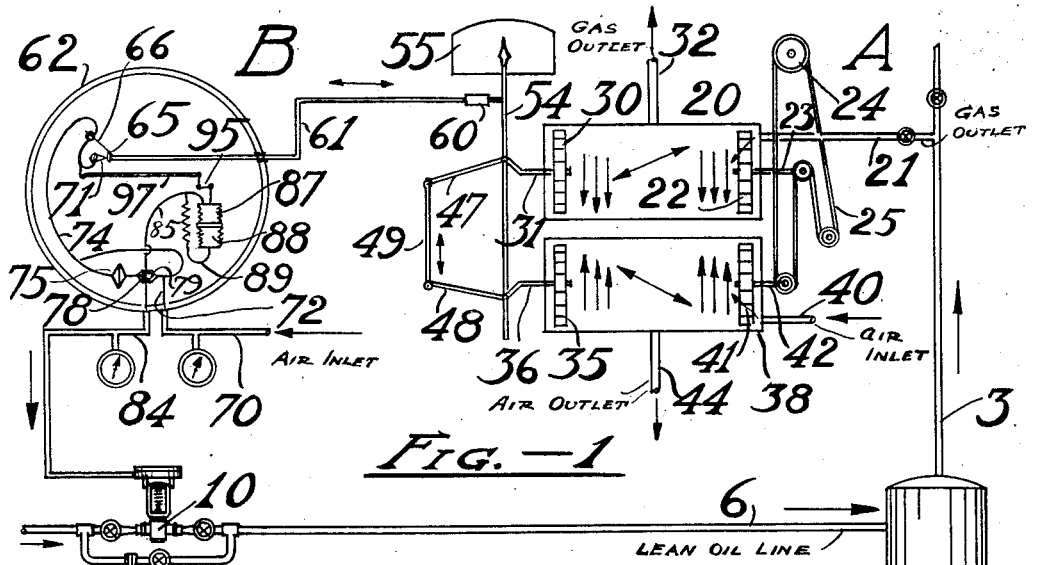
Fig. 1 is a diagrammatic view showing an absorption vessel in combination with mechanism for controlling the introduction of absorbent medium, such as oil, to the vessel.

Referring particularly to Fig. 1, reference numeral 1 designates the shell of an absorption vessel. Hydrocarbon gas containing volatile constituents is fed into the lower portion of the absorption vessel 1 through a gas inlet line 2. The treated gas is discharged from the upper portion of the vessel 1 through a gas discharge passageway 3 and can be used for any desired processing operation, such as in the hydrogenation of petroleum oil. Volatile constituents are removed from the gas in the absorber 1 by means of an absorbing medium such as a lean hydrocarbon oil which is introduced through an inlet conduit 6 into the upper portion of the absorber 1. The lean oil is enriched by the vapors associated with the gas and the resulting fat oil is discharged from the lower portion of the absorber through a line 7 to a suitable place of disposal such as a still, not shown.

The amount of lean oil fed to the absorber is controlled by means of a compressed air operated control valve 10 in the conduit 6. The control valve 10 comprises a parabolic gradual opening valve head 11, valve seat 12 and valve stem 13 mounted for longitudinal reciprocating movement. The valve stem 13 has a headed end 14 protruding into a casing 15. A diaphragm 16 extends transversely of the casing between the headed end 14 and the inlet of a compressed air inlet line 84 to be later described. The compressed air from line 84 actuates the valve.

The gas delivered through gas discharge passageway 3 to the processing operation should be at a constant specific gravity. The gas fed through inlet line 2 may vary in volume, in composition, in temperature, and in pressure from time to time. In order to secure a constant gravity of the gas delivered through the passageway 3, the amount of lean oil supplied through the conduit 6 to the absorber 1 is varied by means of the control valve 10.

The control valve 10 is actuated automatically through a specific gravity responsive device A and a fluid pressure control head mechanism B.

Figure 2:
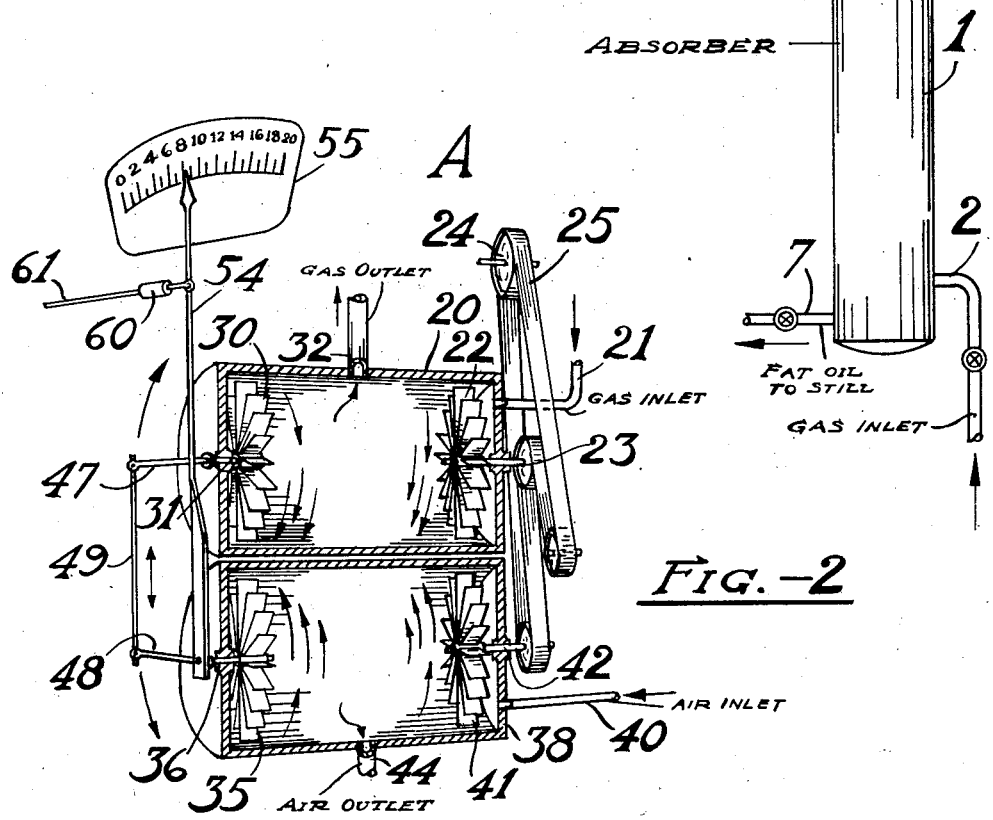
Fig. 2 is a diagrammatic view of the specific gravity sensitive device of the mechanism.

Referring particularly to Figs. 1 and 2, the specific gravity responsive device A comprises a cylindrical chamber 20, one end of which communicates with the gas discharge passageway 3 through a branch line 21. The gas introduced through line 21 is given a rotating motion within the chamber 20 by means of a fan 22. The fan 22 is mounted upon a shaft 23 which is driven in rotation by a motor pulley 24 through a belt 25. The fan 22 drives the gas against the plates of an impulse wheel 30 located opposite the fan 22 in the chamber 20. The impulse wheel is rigidly supported by a shaft 31 mounted for rotation in the end wall of the chamber 20. The effect of the gas upon the impulse wheel 30 is to produce a torque on the shaft 31, the torque being proportional to the specific gravity of the gas. The gas is discharged from an intermediate portion of the chamber 20 through a discharge line 32.

In order to eliminate the influence of changes in the speed of the fan 22, temperature, humidity and atmospheric pressure, a comparing torque is produced on another impulse wheel 35 mounted on a shaft 36 in a chamber 38. The comparing torque is produced by air which is introduced into the chamber 38, through an air inlet line 40. The rotating motion of the air in the chamber 38 is imparted by means of a fan 41 mounted on a shaft 42 and driven in rotation by means of the belt 25. The air is discharged from an intermediate portion of the chamber 38 through an air outlet line 44. The fan 41 is driven in rotation in the opposite direction to the fan 22.

The impulse wheel shafts 31 and 36 are coupled together by means of levers 47 and 48 in turn united by a connecting link 49. This coupling system 47, 48 and 49 prevents complete rotation of the impulse wheels 30 and 35. The difference in the opposing torques exerted upon shafts 31 and 36 causes a limited movement of the system 47, 48 and 49 which movement is transmitted to an arm or element 54. The amount of specific gravity is indicated upon a scale 55. Other types of specific gravity responsive device can be used to actuate an element and some of the advantages will be retained.

Movement of the lever 54 due to variation in the specific gravity of the gas in the discharge passageway is caused to actuate the control valve 10, through the control head B, see Figs. 1 and 3, to regulate the supply of absorbing medium through the conduit 6. The arm 54 is adjustably connected by means of an adjustable collar 60 with a rod 61 which passes slidably through the outer shell 62 of the control head. Other means for adjusting the connection between arm 54 and rod 61 can be used. The rod 61 is connected to a flapper 65. The flapper 65 is mounted for rotation upon a shaft 66. Increase of specific gravity of the gas causes the lever 54 to be moved counter-clockwise as viewed in Fig. 1, and thereby the connecting rod 61 is moved to the left as viewed in Figs. 1 and 3, causing the flapper 65 to be moved in a clockwise direction.

Compressed air from a line 70 is passed through the pressure control B where it is delivered through a nozzle 71 in a manner to be later described, and the flow of the compressed air through the nozzle 71 is controlled by means of the flapper 65. The flapper is continuously held in a balanced position with respect to the nozzle. The variation in the obstruction to the compressed air issuing from the nozzle 71 is caused to influence the valve 72 by the following arrangement of parts: A flexible conduit 74 leading from the nozzle 71 opens through one of the plates of a bellows 75. The other plate is connected to the valve stem 76 of the control head 62. The valve stem 76 carries a valve head 78 and is adapted to be reciprocated in a valve chamber 79 to alternatively open communication between the air inlet 70 or an air outlet 82 and the valve chamber, which in turn is connected to a conduit 84. The compressed air is preferably introduced through the line 70 under a pressure of approximately fifteen pounds per square inch. The bellows 75 is so mounted that alteration in the pressure of the fluid within the bellows, with resultant collapse or expansion of the bellows causes change in position of the valve stem 76. When the instrument is in operation controlling the pressure, the nozzle 71 and the flapper 65 are substantially in contact. The position of the nozzle 71 is determined by the air pressure within a line 85 which opens into the valve chamber 79 and which communicates with a chamber 87 by a sylphon bellows. A chamber 88 of another sylphon bellows communicates through a capillary tube 89 with the line 85. A disc 90 separates the chambers 87 and 88 and is connected through links 91, 92 and 93 with an arm of a bell crank 95. The other arm of the bell crank 95 is connected by a link 97 with the nozzle 71.

Assuming the instrument to be in operating equilibrium, the sleeve 60 functioning as a control point is hand set at the required specific gravity which is indicated through the specific gravity responsive device A. Any change in the specific gravity from this control point is then adjusted by the control head mechanism B, which controls the supply of air through line 84 to the control valve 10 as follows: Air under pressure enters the control head 72 and passes through a by-pass 100 with its restriction 101 and through the line 74 and blows out of the nozzle 71 against the flapper 65. As the flapper 65 moves to the left it retracts the flow of air from the nozzle 71 and builds pressure within the bellows 75. The bellows 75 therefore expands, thereby moving the pilot valve 78 to the right as viewed in Fig. 3, shutting off the air entering the valve chamber and permitting the air to leak away from the diaphragm valve and sylphon bellows 87 at 82. The sylphon bellows are actuated by springs, not shown, inside the bellows. Since the pressure in chamber 87 is reduced, the greater pressure in chambers 88 functions to cause the disc 90 with its attached links to be moved upwardly thereby rotating the bell crank 95 counter-clockwise as viewed in Fig. 3, and in turn withdrawing the nozzle 71 to the left as viewed in Fig. 3. This produces the opposite effect, with respect to the compression of the air issuing from the nozzle 71 from that produced when the flapper 65 is moved to the left as viewed in Fig. 3, and thereby tends to minimize the effect of moving the flapper. The mechanism thereby seeks a balanced position.

A relationship is established between the movement of the control valve 10, a function of the pressure in line 84 and the magnitude of the change in position of the rod 61. Since the sylphon 88 is connected to the sylphon 87 through the capillary tube 89, the pressure in the sylphons 87 and 88 becomes balanced at a rate depending upon the length and diameter of the capillary tube. The leader system 93, 95 and 97 is thus brought back to a mid-position. While a particular form of pressure controller has been described, it will be understood that other devices for this purpose can be used within the scope of this invention.

By the construction described, a control point, for example of 0.7 specific gravity, can be set for the outlet gas gravity and the specific gravity of the gas is automatically controlled to this point without any further controls on volume, pressure or temperature being necessary. The control point is hand set at the required gravity which is indicated upon the scale 55 by the element 54. Any change in gravity from this control point is then adjusted by the control head mechanism B operating by compressed air the valve 10 in the lean oil supply conduit to the absorber. In one application of the invention it is used to control the specific gravity of process gas in the hydrogenation of oil. This gas must be supplied at a certain constant gravity which necessitates varying the amount of lean oil to the absorber to meet changing volumes in gas, changing compositions in gas fed to the absorber and changing temperatures and pressures. While the invention has been described as applied to the control of flow of absorption liquid, it will be understood that it can be applied to the control of flow of any fluid by means of changes in the specific gravity of another fluid, and some of the advantages of the invention will be retained.

Various changes may be made within the scope of the appended claims in which it is desired to claim all novelty inherent in the invention as broadly as the prior art permits.

I claim:

1. A control device, comprising an absorber, a discharge passageway for devaporized gas leading from the absorber, an inlet conduit for lean oil leading into the absorber, a valve in the conduit, and means associated with the passageway and valve responsive to variations in the specific gravity of the gas flowing through the passageway to move the valve whereby the passage of oil through the inlet conduit is controlled.

2. A control device, comprising an absorber, a discharge passageway for devaporized gas leading from the absorber, an inlet conduit for lean oil leading into the absorber, a compressed air actuated valve in the conduit, a control device for the compressed air, and means associated with the passageway and valve responsive to variations in the specific gravity of the gas flowing through the passageway to move the control device to regulate the valve.

3. A control device comprising an absorber, a discharge passageway for devaporized gas leading from the absorber, an inlet conduit for lean oil leading into the absorber, a valve in the conduit, a compressed air line connected to the valve whereby the valve is actuated, a control device for the compressed air line, means associated with the passageway responsive to variations in the specific gravity of the gas, and means operatively connecting the last mentioned means and the control device whereby change in specific gravity of the gas alters the amount of compressed air supplied to actuate the valve.

4. A control device, comprising an absorber, a discharge passageway for devaporized gas leading from the absorber, an inlet conduit for lean oil leading into the absorber, a valve in the inlet conduit, a specific gravity responsive device operatively connected to the gas outlet passageway and actuated by the specific gravity of the gas in the passageway, and means operatively connecting the specific gravity responsive device and the valve whereby change in specific gravity of the gas is caused to move the valve.

5. A control device, comprising an absorber, a discharge passageway for devaporized gas leading from the absorber, an inlet conduit for lean oil leading into the absorber, a valve in the conduit, a movably mounted element, means operatively connecting the element with the valve to actuate the valve upon movement of the element, and a specific gravity responsive device operatively connected to the gas passageway and to the element to move the element upon change in specific gravity of the gas whereby the valve is actuated to control the flow of oil into the absorber.

6. A control device, comprising an absorber, a discharge passageway for devaporized gas leading from the absorber, an inlet conduit for lean oil leading into the absorber, a valve in the conduit, an element, means operatively connecting the element and valve whereby the valve is opened upon movement of the element in one direction and is closed upon movement of the elment in the opposite direction, and means responsive to variations in the specific gravity of the gas flowing through the passageway to move the element in the first mentioned direction when the specific gravity is increased and to move the element in the opposite direction when the specific gravity is decreased.

GEORGE L. MATEER.